(12) United States Patent
Trouve et al.

(10) Patent No.: US 9,971,956 B2
(45) Date of Patent: May 15, 2018

(54) DETECTION AND PRESENTATION OF DIFFERENCES BETWEEN 3D MODELS

(71) Applicant: International Business Machines Corporation, Armonk, NY (US)

(72) Inventors: Romain Trouve, Thouars (FR); Francois Varchon, Montpellier (FR); Guillaume O. Villette, Le Mans (FR); Gauthier Zirnhelt, Truchtersheim (FR)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 15/075,629

(22) Filed: Mar. 21, 2016

(65) Prior Publication Data

US 2017/0270386 A1    Sep. 21, 2017

(51) Int. Cl.
*G06K 9/68*      (2006.01)
*G06K 9/62*      (2006.01)

(52) U.S. Cl.
CPC .................................. *G06K 9/6215* (2013.01)

(58) Field of Classification Search
None
See application file for complete search history.

(56) References Cited

U.S. PATENT DOCUMENTS

| | | | | |
|---|---|---|---|---|
| 7,046,841 B1 * | 5/2006 | Dow | ...................... | G01C 11/00 345/419 |
| 8,155,452 B2 * | 4/2012 | Minear | ................... | G06K 9/741 382/181 |
| 8,179,393 B2 * | 5/2012 | Minear | ..................... | G06T 7/30 345/419 |

(Continued)

FOREIGN PATENT DOCUMENTS

| | | |
|---|---|---|
| WO | 2006027339 A2 | 3/2006 |
| WO | 2013106802 A1 | 7/2013 |

OTHER PUBLICATIONS

Theiler, P. W., and K. Schindler. "Automatic registration of terrestrial laser scanner point clouds using natural planar surfaces." ISPRS Annals of Photogrammetry, Remote Sensing and Spatial Information Sciences 3 (2012): 173-178.*

(Continued)

*Primary Examiner* — Andrae S Allison
(74) *Attorney, Agent, or Firm* — Steven Lee Fisher-Stawinski; Aaron N. Pontikos

(57) ABSTRACT

A computer-implemented method includes receiving a first 3D model and a second 3D model, wherein the first 3D model represents a first set of object and the second 3D model represents includes a second set of objects. The computer-implemented method further includes scanning each of the first 3D model and the second 3D model to identify the first set of objects and the second set of objects, wherein the first set of objects and the second set of objects have at least one common object. The computer-implemented method further includes comparing the first set of objects to the second set of objects to yield one or more differences. The computer-implemented method further includes sorting each of the one or more differences based on a set of rules to yield a list of differences. A corresponding computer system and computer program product are also disclosed.

18 Claims, 3 Drawing Sheets

(56) References Cited

U.S. PATENT DOCUMENTS

| | | | |
|---|---|---|---|
| 8,275,547 B2* | 9/2012 | Rousselle | G06Q 10/10 |
| | | | 33/228 |
| 8,290,305 B2* | 10/2012 | Minear | G06T 7/32 |
| | | | 345/629 |
| 8,374,431 B2* | 2/2013 | Dow | G01B 11/24 |
| | | | 382/154 |
| 8,422,763 B2 | 4/2013 | Gutierrez | |
| 8,781,217 B2 | 7/2014 | Gurman et al. | |
| 2002/0004710 A1* | 1/2002 | Murao | G06T 17/005 |
| | | | 702/167 |
| 2004/0041805 A1* | 3/2004 | Hayano | G06T 15/00 |
| | | | 345/419 |

OTHER PUBLICATIONS

Oniga, V. E. "A new method for buildings 3D models comparison." Journal of Geodesy and Cadastre RevCAD 17 (2014): 60-67.*

Cornelis et al., "3D City Modeling using Cognitive Loops", 1 page, retrieved on Jan. 11, 2016, <https://www.vision.ee.ethz.ch/publications/papers/proceedings/eth_biwi_00454.pdf>.

Oniga, Valeria Ersilia, "A New Method for Buildings 3D Models Comparison", pp. 60-67, University "Dec. 1, 1918" of Alba Iulia, RevCAD 17/2014, captured May 11, 2015, <http://www.uab.ro/geocad/upload/36_435_Paper8_RevCAD17_2014.pdf>.

\* cited by examiner

DETECTION AND PRESENTATION OF DIFFERENCES BETWEEN 3D MODELS

BACKGROUND

The present disclosure relates generally to 3D models and in particular to detecting and presenting differences between 3D models.

The development of computer vision has led to an increase in the ability to recover the three-dimensional shape and appearance of objects in imagery. Currently, there exist various domains for which 3D environmental comparisons are utilized. For example, 3D models may be used for post disaster assessment of infrastructure systems and buildings by comparing a 3D model of pre-event conditions to a 3D model of post-event conditions. However, the number of differences that may be detected between 3D models can be excessive and overwhelmingly time consuming to review.

SUMMARY

A computer-implemented method includes receiving a first 3D model and a second 3D model, wherein the first 3D model represents a first set of object and the second 3D model represents includes a second set of objects. The computer-implemented method further includes scanning each of the first 3D model and the second 3D model to identify the first set of objects and the second set of objects, wherein the first set of objects and the second set of objects have at least one common object. The computer-implemented method further includes comparing the first set of objects to the second set of objects to yield one or more differences. The computer-implemented method further includes sorting each of the one or more differences based on a set of rules to yield a list of differences. A corresponding computer system and computer program product are also disclosed.

DETAILED DESCRIPTION

The ability to recover the three-dimensional shape and appearance of objects in imagery has been further aided by the emergence of reliable techniques for accurately computing a partial 3D model of an environment from a plurality of overlapping 2D images. The inventors have observed and/or recognized that an improvement in the inventory process (e.g., manual counts, radio frequency identification, etc.) for various environments may be gained by comparing a first 3D model with a second 3D model constructed from a plurality of overlapping 2D images. The inventors have further observed and/or recognized that current inventory processes are time consuming, error prone, require tracking and/or reviewing thousands of different items or conditions, and are vulnerable to human dishonesty. The inventors have further observed and/or recognized that current inventory processes are incompatible with certain environments. It should be appreciated that the present invention may be implemented in a wide variety of environments, including, but not limited to rental housing, rental cars, merchant stores, storage facilities, and warehouses. Various embodiments of the present invention may exhibit some or all of the aforementioned advantages, however it will be understood that addressing any particular problem or disadvantage or exhibiting any particular advantage is not a necessary requirement for the practice of all embodiments of the present invention.

Figure 1:
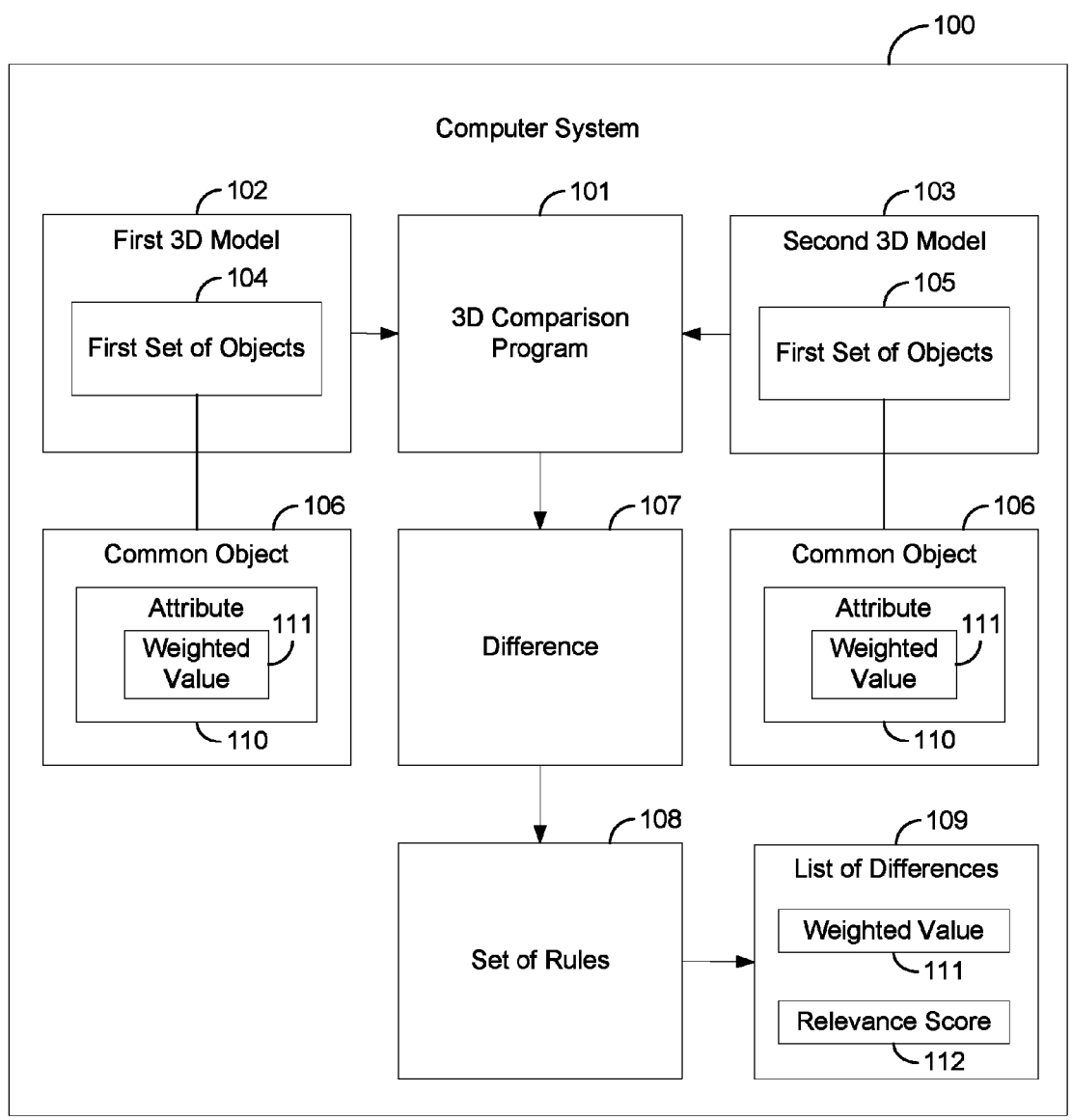
FIG. 1 is a block diagram of a computer system environment suitable for operation in accordance with at least one embodiment of the invention.

The present invention will now be described in detail with references to the Figures. FIG. 1 is a block diagram of one embodiment of a computer system environment suitable for operation in accordance with at least one embodiment of the invention. It should be appreciated that in various embodiments of the invention, the 3D comparison program 101 may exist in a cloud-based, virtual, or distributed environment, or a remote environment on defined server hardware.

Within a computer system 100, a 3D comparison program 101 may receive a first 3D model 102 and a second 3D model 103. In 3D computer graphics, 3D modeling may be understood as the process of developing a mathematical representation of any three-dimensional surface of an object. Here, a three-dimensional wire frame model may be converted into a two-dimensional image with 3D photorealistic effects. Furthermore, the first 3D model 102 may represent a first set of objects 104 and the second 3D model 103 may represent a second set of objects 105. An object may generally be understood as anything in a 3D model that is visible or tangible and is relatively stable in form. In one embodiment of the invention, receiving the first 3D model 102 and the second 3D model 103 may further include, for at least one 3D model, receiving one or more 2D images, and reconstructing the one or more 2D images into a 3D model. The 3D comparison program 101 may reconstruct one or more 2D images into a 3D model by any generally known reconstruction methods, including, but not limited to multi-view stereo reconstruction algorithms.

The 3D comparison program 101 may further scan each of the first 3D model 102 and the second 3D model 103 to identify the first set of objects 104 and the second set of objects 105. More specifically, the 3D comparison program 101 may identify at least one common object 106 between the first set of objects 104 and the second set of objects 105. The 3D comparison program 101 may further compare the first set of objects 104 to the second set of objects 105 to yield one or more differences 107. The one or more differences 107 may be the result in the change of one or more common objects 106 of a first environment, represented by the first 3D model 102 and a second environment, represented by the second 3D model 103, over a given period of time. Similarly, the one or more differences 107 may be the result of the presence of an object in a first environment, represented by the first 3D model 102 and the absence of the same object in second environment, represented by the second 3D model 103, over a period of time. The 3D comparison program 101 may further sort each of the one or more differences 107 based on a set of rules 108 to yield a list of differences 109. In one embodiment of the invention, the list of differences 109 may be sorted according to a weighted value 110 of an attribute 111 associated with the common object 106. In another embodiment of the invention, the list of differences 109 may be sorted according to a relevance score 112 associated with the common object 106.

Figure 2:
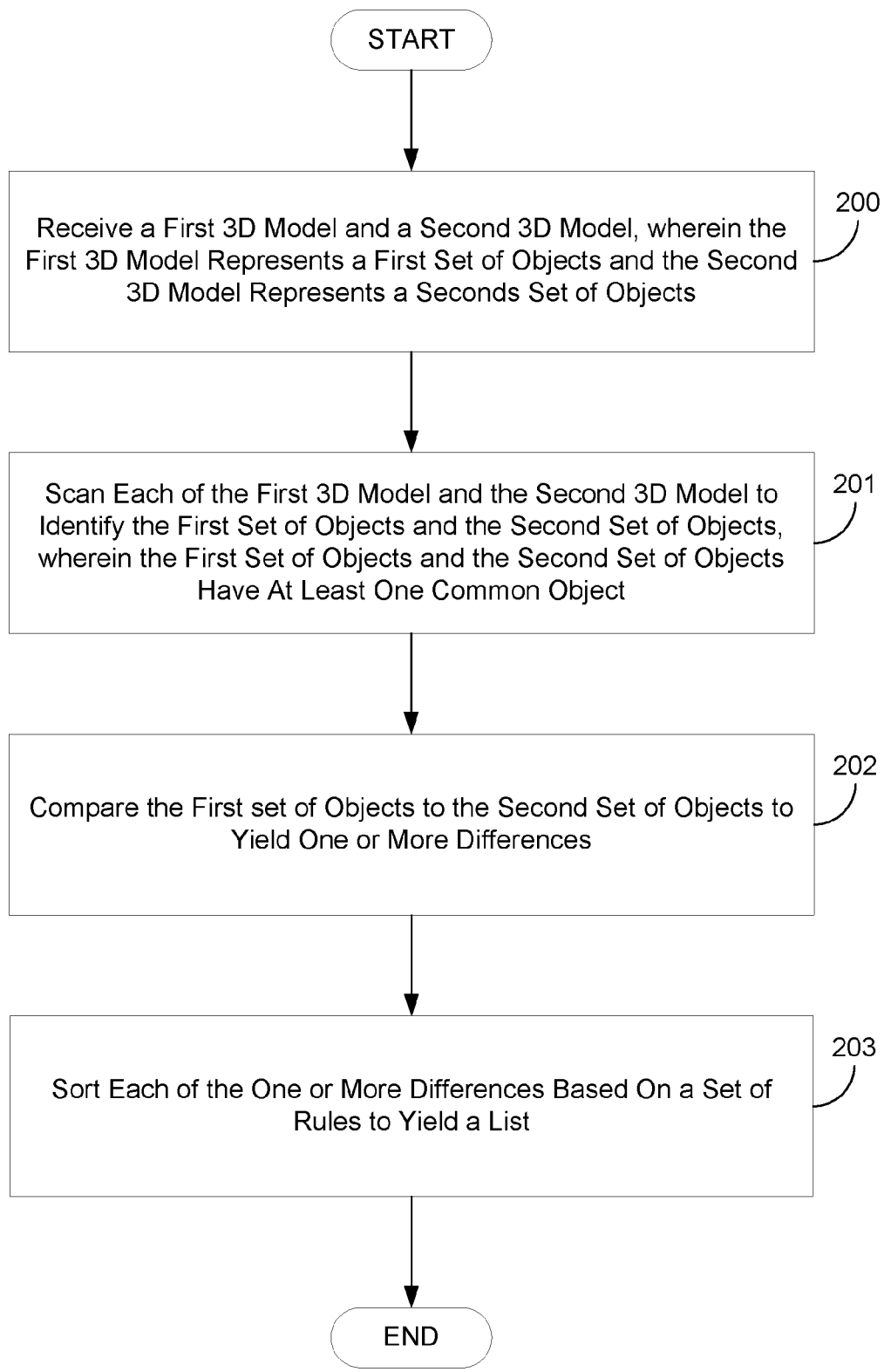
FIG. 2 is a flow chart diagram depicting operational steps for a 3D comparison program in accordance with at least one embodiment of the invention.

FIG. 2 is a flow chart diagram depicting various steps for the 3D comparison program in accordance with at least one embodiment of the invention. According to the depicted embodiment, at step 200, the 3D comparison program 101 receives a first 3D model 102 and a second 3D model 103. Types of 3D models that the 3D comparison program 101 may receive include, but are not limited to, wire-frame models (i.e., modeling an object by specification of each edge of the physical object where two mathematically continuous smooth surfaces meet or connection of an object's constituent vertices using straight lines or curves), polygonal models (i.e., modeling an object by representing or approximating their surfaces using polygons), curve models (i.e., modeling an object by defining the object's surfaces as curves, which are influenced by weighted control points), and digitally sculpted models (e.g., displacement, volumetric, and dynamic tessellation). The first 3D model 102 and the second 3D model 103 may further include a first set of objects 104 and a second set of objects 105, respectively. Each object of the first set of objects 104 and said second set of objects 105 may further include one or more attributes 110 (e.g., color, texture, shape, position, volume, etc.).

In an alternative embodiment of the invention, at step 200, receiving the first 3D model 102 and the second 3D model 103 may further include receiving a video, extracting one or more video frames, and reconstructing the one or more video frames into a 3D model. In an alternative embodiment of the invention, receiving the first 3D model 102 and the second 3D model 103 may further include, for at least one of the first 3D model 102 and the second 3D model 102, receiving one or more 2D images and reconstructing the one or more 2D images into a 3D model.

For example, the 3D comparison program 101 may receive a first set of ten digital images of an apartment living room taken with a digital camera at a first instance and a second set of ten digital images of the same apartment living room taken with a digital camera at a second instance. Each successive digital image of each set of ten digital images may overlap the previous image. The 3D comparison program 101 may reconstruct the first set of ten digital images into a first 3D model 102 (e.g., wire frame model) and the second set of ten digital images into a second 3D model 103 (e.g., polygon-based model) using a Voxel Coloring Algorithm. Here, a voxel coloring algorithm assigns colors (radiances) to voxels (points) in a 3D volume so as to achieve consistency with a set of basis images of different viewpoints. The consistency of colors between different viewpoints is then used to perform a volumetric reconstruction of the original image. In yet a further embodiment of the invention, the 3D comparison program 101 may implement 3D rendering (e.g., scanline rendering, ray tracing, radiosity, etc.) to convert the 3D wire frame model or the 3D polygon-based model into a 2D image with 3D photorealistic effects.

At step 201, the 3D comparison program 101 may scan each of the first 3D model 102 and the second 3D model 103 to identify the first set of objects 104 and the second set of objects 105. More specifically, the 3D comparison program 101 may identify at least one common object 106 between the first set of objects 104 and the second set of objects 105. In an embodiment of the invention, the 3D comparison program 101 may further identify the absence of one or more objects between the first set of objects 104 and the second set of objects 105. The 3D comparison program 101 may scan a 3D model to identify a set of objects or the absence of one or more objects by any generally known image segmentation methods, including, but not limited to clustering methods, compression-based methods, edge detection methods, etc.

At step 202, the 3D comparison program 101 may compare the first set of objects 104 and the second set of objects 105 to yield one or more differences 107. More specifically, the 3D comparison program 101 may compare the first set of objects 104 and the second set of objects 105 by calculating a measurement of change between an attribute 110 of a common object 106 between the first set of objects 104 and the second set of objects 105. The 3D comparison program 101 may calculate a measurement of change by any generally known methods, including, but not limited to an image distance measure. Here, the 3D comparison program 101 may compare the similarity between each common object 106 between the first set of objects 104 of the first 3D model 102 and the second set of objects 105 of the second 3D model 103 according to various dimensions or attributes 110 (e.g., color, texture, thickness, shape, position, volume, etc.).

At step 203, the 3D comparison program 101 may sort each of the one or more differences 107 based on a set of rules 108 to yield a list of differences 109. In one embodiment of the invention, the set of rules 108 may include a rule to ignore the one or more differences 107 that are negligible. Here, the 3D comparison program 101 may ignore one or more differences 107 that fall below a given threshold value for a given dimension or attribute 110. For example, the 3D comparison program 101 may ignore a difference in the position of a common object 106 if the threshold value for movement of an object is greater than twelve inches and the common object 106 has only moved two inches. In another example, the 3D comparison program 101 may ignore a difference in the color of a common object 106 if the threshold value for color of an object is brown and the common object 106 is red. In yet another example, the 3D comparison program 101 may ignore a difference in the thickness of a common object 106 if the threshold value for thickness of an object is below twenty millimeters and the common object 106 is thirty millimeters.

In an embodiment of the invention, the set of rules 108 may further include a rule to sort each of the one or more differences 107 based on the weighted 111 value of the attribute 110. Here, the 3D comparison program 101 may assign a weighted value 111 (e.g., a number between zero and one) to an attribute 110 based on the importance of the attribute 110. The assignment of a weighted value 111 to each attribute 110 may initially be determined by a user based on the importance of the attribute 110 with respect to a given user. For example, the attribute 110 "scratch or dent" of an object may be given a weighted value 110 of 0.75, the attribute 110 "change in color" of the object may be given a weighted value 111 of 1, and the attribute 107 "change in position" of the object may be given a weighted value 111 of 0.5.

In an embodiment of the invention, the set of rules 108 may further include a rule to sort each of the one or more differences 107 based on a relevance score 112. The relevance score 112 may be calculated by multiplying the measurement of change between a common object 106 between the first set objects 104 and the second set of objects 105 by the weighted value 111 of the attribute 110 associated with the common object 106. For example, the 3D comparison program 101 may calculate a measurement of change of four inches between a common object 106 for the attribute 110 "scratch or dent" (e.g., weighted value 111 of 0.75). Thus, the 3D comparison program 101 may calculate a relevance score 112 by multiplying the measurement of change (four inches) by the weighted value 111 of the attribute 110 (0.75) to yield a relevance score 112 of three. In another example, the 3D comparison program 101 may calculate a measurement of change of ten inches between a common object 106 for the attribute 110 "change in position" (e.g., weighted value 111 of 0.5). Thus, the 3D comparison program 101 may calculate a relevance score 112 by multiplying the measurement of change (ten inches) by the weighted value 111 of the attribute 110 (0.5) to yield a relevance score 112 of five.

In an embodiment of the invention, each of the one or more differences 107 presented in the list of differences 109 may be either accepted or rejected. The 3D comparison program 101 may adjust the weighted value 111 of an attribute 110 according to whether each of the one or more differences 107 is either accepted or rejected. Here, the one or more differences 107 may be either accepted or rejected by a user. The 3D comparison program 101 may adjust the weighted value 111 of an attribute 110 by any generally known methods, including, but not limited to the use of machine learning. In machine learning, support vector machines ("SVM") are applied to analyze data and recognize patterns. An SVM is a form of computer software that consists of supervised learning, wherein supervised learning is the machine learning task of analyzing data and recognizing patterns. An example of pattern recognition is classification, which attempts to assign each input value to one of a given set of classes (e.g., assigning a given email into "spam" or "non-spam" classes). Thus, given a training set, each marked for belonging to a class, an SVM solver intelligently builds a model that assigns new examples into one of the available classes. The 3D comparison program 101 may use any standard SVM solvers or tools, such as a library for support vector machines ("LIBSVM").

For example, the 3D comparison program may use an SVM to produce classification models in which each feature or attribute 110 is given a weight. The more important attributes 110 are assigned a higher weight, while less important attributes 110 are given a lower weight. The weights may be assigned based on domain knowledge about the relative importance of the attributes 110. The relative importance of the attributes 110 may be determined based on the user either accepting or rejecting the one or more differences 107. If the user accepts a difference 107 for an attribute 110 (e.g., "scratch or dent"), the attribute 110 "scratch or dent" may be assigned to the class "accepted." Alternatively, if the user rejects a difference 107 for the attribute 110 "scratch or dent," the attribute 110 "scratch or dent" may be assigned to the class "rejected."

Based on whether an attribute 110 falls under the class "accepted" or "rejected," the 3D comparison program 101 may further determine a pattern of acceptance or rejection based on an attribute 110 of a particular object. For example, the 3D comparison program 101 may determine a pattern wherein the user repeatedly accepts a difference 107 of three inches or more for the attribute 110 "scratch or dent" for a common object 106 "table," but rejects a difference 107 of less than six inches for the attribute 110 "scratch or dent" for a common object 106 "wall."

More specifically, the 3D comparison program 101 may adjust the weighted value 111 of an attribute 110 based on a selection history of a given attribute 110 over time. For example, if a selection history indicates a high acceptance rate of one or more differences 107 of a common object 106 for the attribute 111 "scratch or dent", the 3D comparison program may increase the weighted value 111 of the attribute 110 "scratch or dent" from 0.75 to 0.85. On the other hand, if a selection history indicates a high rejection rate of one or more differences 107 of a common object 106 for the attribute 110 "change in position", the 3D comparison program may decrease the weighted value 111 of the attribute 110 "change in position" from 0.5 to 0.35. It should be appreciated that by adjusting the weighted value 111 of each attribute 110 based on the selection or rejection (i.e., user feedback) of one or more difference 107, the 3D comparison program 101 may ultimately better sort the one or more differences 107 based on a user's specific preferences.

Figure 3:
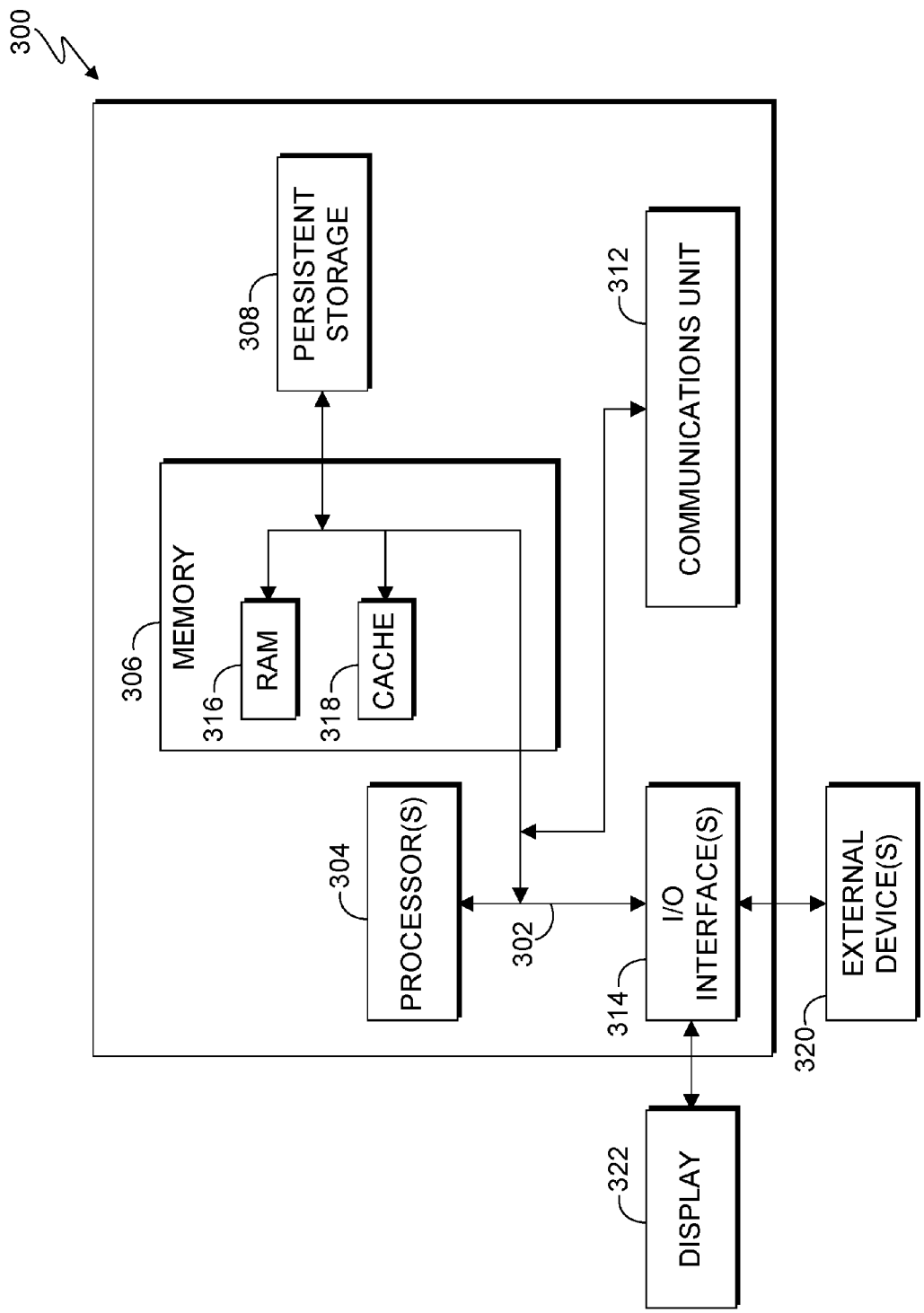
FIG. 3 is a block diagram depicting components of a computer suitable for executing the 3D comparison program in accordance with at least one embodiment of the invention.

FIG. 3 is a block diagram depicting components of a computer 300 suitable for executing the 3D comparison program 101, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 348. In general, the memory 306 may comprise any suitable volatile or non-volatile one or more computer readable storage media.

Program instructions for the 3D comparison program 101 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a first 3D model and a second 3D model, said first 3D model representing a first set of objects and said second 3D model representing a second set of objects;
   scanning each of said first 3D model and said second 3D model to identify said first set of objects and said second set of objects, said first set of objects and said second set of objects having at least a first common object;
   comparing said first set of objects to said second set of objects to yield one or more differences; and
   sorting each of said one or more differences based on a set of rules to yield a list of differences, wherein:
   said set of rules includes a first rule to sort each of said one or more differences based on a relevance score, said relevance score being calculated by multiplying a measurement of change between an attribute of said first common object by a weighted value of said attribute.

2. The computer-implemented method of claim 1, wherein receiving said first 3D model and said second 3D model further comprises:
   for at least one said first 3D model and said second 3D model:
   receiving one or more 2D images; and
   reconstructing said one or more 2D images into a 3D model.

3. The computer-implemented method of claim 1, wherein said set of rules includes a second rule to ignore one or more differences that are negligible, said one or more differences being negligible if said one or more differences fall below a given threshold value.

4. The computer-implemented method of claim 1, wherein said set of rules includes a third rule to calculate said measurement of change between said attribute of said first common object of said first set of objects and said second set of objects.

5. The computer-implemented method of claim 1, wherein said set of rules includes a fourth rule to sort each of said one or more differences based on said weighted value of said attribute.

6. The computer-implemented method of claim 5, wherein said weighted value of said attribute is adjusted according to whether each of said one or more differences is either accepted or rejected.

7. The computer-implemented method of claim 1, wherein each of said one or more differences is either accepted or rejected.

8. A computer program product, the computer program product comprising one or more computer readable storage media and program instructions stored on said one or more computer readable storage media, said program instructions comprising instructions to:
   receive a first 3D model and a second 3D model, said first 3D model representing a first set of objects and said second 3D model representing a second set of objects;
   scan each of said first 3D model and said second 3D model to identify said first set of objects and said second set of objects, said first set of objects and said second set of objects having at least one common object;
   compare said first set of objects to said second set of objects to yield one or more differences; and
   sort each of said one or more differences based on a set of rules to yield a list of differences, wherein:
   said set of rules includes a first rule to sort each of said one or more differences based on a relevance score, said relevance score being calculated by multiplying a measurement of change between an attribute of said first common object by a weighted value of said attribute.

9. The computer program product of claim 8, wherein receiving said first 3D model and said second 3D model further comprises:
   for at least one said first 3D model and said second 3D model:
   receiving one or more 2D images; and
   reconstructing said one or more 2D images into a 3D model.

10. The computer program product of claim 8, wherein said set of rules includes a second rule to ignore one or more differences that are negligible, said one or more differences being negligible if said one or more differences fall below a given threshold value.

11. The computer program product of claim 8, wherein said set of rules includes a third rule to calculate said measurement of change between said attribute of said first common object of said first set of objects and said second set of objects.

12. The computer program product of claim 8, wherein said set of rules include a fourth rule to sort each of said one or more differences based on said weighted value of said attribute.

13. The computer program product of claim 12, wherein said weighted value of said attribute is adjusted according to whether each of said one or more differences is either accepted or rejected.

14. The computer program product of claim 8, wherein each of said one or more differences is either accepted or rejected.

15. A computer system, the computer system comprising:
   one or more computer processors;
   one or more computer readable storage media;
   computer program instructions;

said computer program instructions being stored on said one or more computer readable storage media;
said computer program instructions comprising instructions to:
  receive a first 3D model and a second 3D model, said first 3D model representing a first set of objects and said second 3D model representing a second set of objects;
  scan each of said first 3D model and said second 3D model to identify said first set of objects and said second set of objects, said first set of objects and said second set of objects having at least one common object;
  compare said first set of objects to said second set of objects to yield one or more differences; and
  sort each of said one or more differences based on a set of rules to yield a list of differences, wherein:
    said set of rules includes a first rule to sort each of said one or more differences based on a relevance score, said relevance score being calculated by multiplying a measurement of change between an attribute of said first common object by a weighted value of said attribute.

16. The computer system of claim 15, wherein receiving said first 3D model and said second 3D model further comprises:
  for at least one said first 3D model and said second 3D model:
    receiving one or more 2D images; and
    reconstructing said one or more 2D images into a 3D model.

17. The computer system of claim 15, wherein said set of rules includes a rule to sort said one or more differences selected from the group consisting of:
  (a) ignore each of said one or more differences that are negligible, said one or more differences being negligible if said one or more differences fall below a given threshold value;
  (b) calculate said measurement of change between said attribute of said first common object of said first set of objects and said second set of objects; and
  (c) sort each of said one or more differences based on said weighted value of said attribute.

18. The computer system of claim 15, wherein each of said one or more differences is either accepted or rejected, and further wherein said weighted value of said attribute is adjusted according to whether each of said one or more differences is either accepted or rejected.

* * * * *